R. SEIDL.
METHOD OF CLEANING GRAIN.
APPLICATION FILED JULY 10, 1914.
1,152,920.
Patented Sept. 7, 1915.
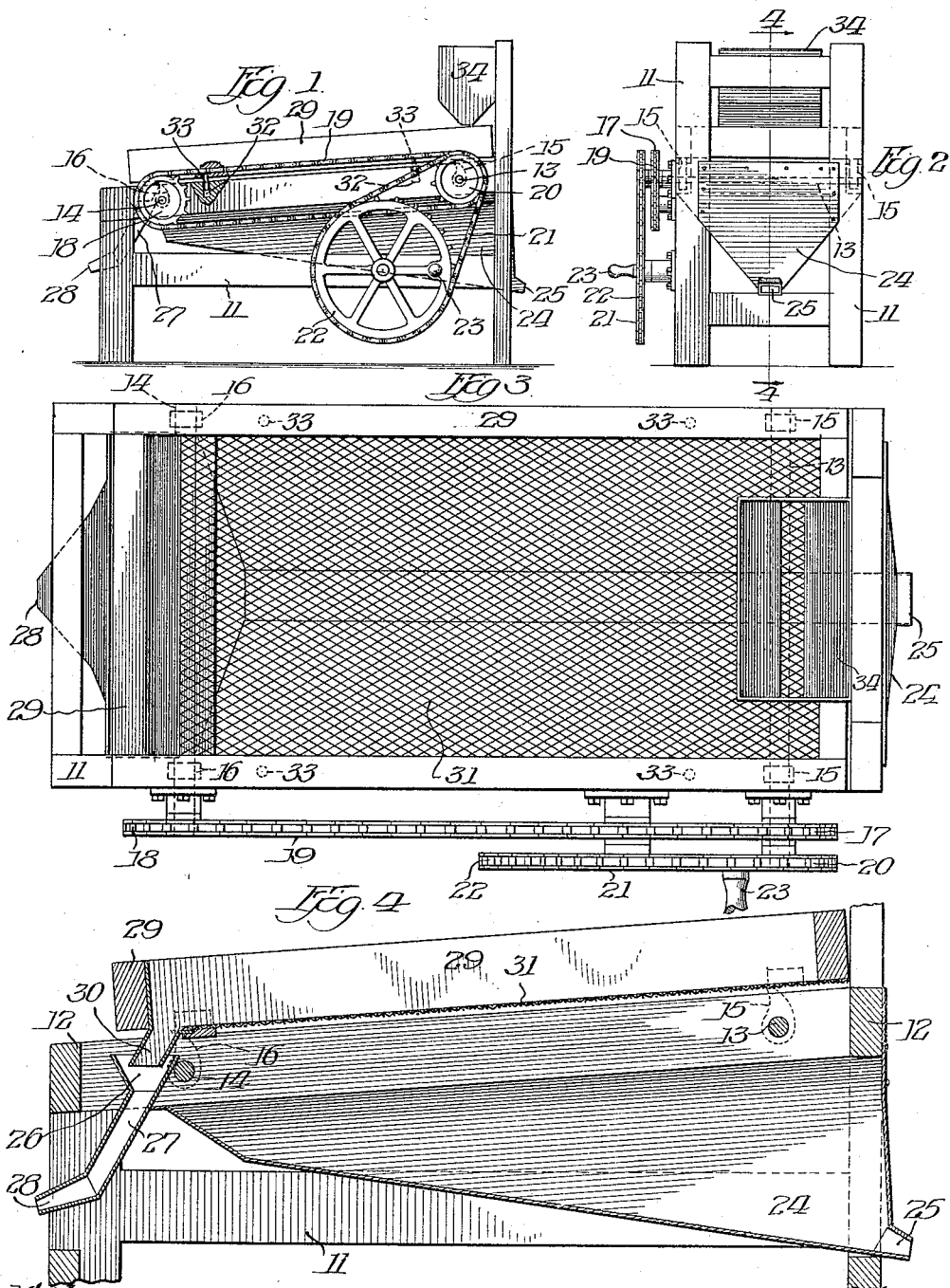

UNITED STATES PATENT OFFICE.

RUDOLF SEIDL, OF MINNEAPOLIS, MINNESOTA.

METHOD OF CLEANING GRAIN.

1,152,920.  Specification of Letters Patent.  Patented Sept. 7, 1915.

Application filed July 10, 1914. Serial No. 850,142.

*To all whom it may concern:*

Be it known that I, RUDOLF SEIDL, a citizen of the United States, residing at Minneapolis, in the county of Hennepin and State of Minnesota, have invented certain new and useful Improvements in Methods of Cleaning Grain, of which the following is a specification.

The invention, while adapted in general to the cleaning of various kinds of grain, is peculiarly suited to the removal of wild oats from wheat and the like and involves the utilization of the difference in shape of the grains as well as the eccentric location of the center of gravity of certain of the grains.

In carrying out my invention I provide mechanism whereby the mass of grain with its content of wild oats is thrown into the air from an inclined screen and permitted to fall through a distance sufficient to permit the slender elongated grains of wild oats to assume a vertical position head downward before they reach the screen, in which position they can pass through the meshes while the wheat or other grain, being thicker, will not pass through, but will be discharged at the lower end of the screen.

I am aware of the practice of tossing grain to be cleaned into the air and causing a blast to act upon it as it falls whereby the lighter portion is blown aside; also that grain or other matter to be graded according to size has been allowed to fall upon a screen so that the smaller particles will pass through. So far as I am informed, however, it is new to separate elongated kernels from those more nearly spherical, taking advantage of their difference in shape and of the location of the center of gravity near the head of the elongated kernels, by tossing the mass into the air and causing the elongated grains to fall endwise so as to pass through a screen even though they may have an aggregate bulk greater than those other grains which do not pass through.

In order that the invention may be readily understood and the manner of its operation made clear, a preferred form of machine embodying the same is set forth in the accompanying drawing and in the description based thereon. As, however, the machine is capable of modification within wide range without departure from the essence of the invention or impairment of its function in carrying out the improved method, the drawing and description are to be taken in an illustrative and not in an unnecessarily limiting sense.

In the drawing, Figure 1 is a side elevation of a separator embodying the invention; Fig. 2 is an end view of the same; Fig. 3 is a top plan view upon an enlarged scale; and Fig. 4 is an enlarged view in vertical longitudinal section taken on the line 4—4 of Fig. 2.

As illustrated, the machine frame is indicated generally at 11, the upper frame members 12 thereof being inclined to the horizontal and having journaled near their upper and lower ends the shafts 13 and 14, the upper shaft 13 has fixed upon its two ends cams 15, 15, and the lower shaft 14 has fixed upon its two ends the cams 16, 16. The shafts 13 and 14 have keyed thereto sprocket wheels 17 and 18 traversed by a sprocket chain 19, and the shaft 13 has also keyed thereon a second sprocket 20 connected by means of a sprocket chain 21 with a drive sprocket 22 adapted to be driven by a handle 23 or by any suitable source of power. Beneath the machine frame is a hopper 24 the inclined bottom of which leads to a discharge outlet at 25 at the rear of the machine and at the front of the machine is a similar hopper 26 communicating with a chute 27 which leads to the discharge outlet 28 at the front of the machine.

Adapted to rest upon the upper frame members 12 is a screen frame 29 having at its lower end a spout 30 discharging into the hopper 26 and having stretched across its open bottom a screen 31 of a mesh less than the cross sectional diameter of a grain of wheat and greater than the cross sectional diameter of a grain of wild oats. The upper face of the frame member 12 is provided with recesses or sockets 32 and the lower face of the said members of the screen frame 29 are provided with pins 33 adapted to enter the sockets 32 and to reciprocate vertically therein. Above the upper end of the screen is mounted a feed hopper 34 the lower contracted open end of which discharges upon the screen.

In operation the mass of wheat or other grains or seeds and wild oats is placed in the hopper 34, thence it feeds gradually upon the screen at its upper end and spreads under the influence of gravitation and agitation over the surface of the screen and works its way toward the lower end and the spout 30. By the rotation of the drive wheel 22 the cams 15 and 16 are caused to rapidly revolve and to quickly lift the screen with its layer of grain, and suddenly permit the screen to drop, whereby the grain is projected a distance of two or three inches into the air and then allowed to fall upon the screen. In falling the action of gravity upon the unbalanced grains of wild oats is such as to cause the same to turn and shoot downward head first like an arrow and to pass through the meshes of the screen while the thicker grains of wheat are caught by the screen and continue to travel downward toward the outlet spout. By the time the mass reaches the spout 30 the grains of wild oats have all found their way through the screen into the hopper 24 whence they are discharged at 25 while the wheat finds its way through the spout 30 to the hopper 26 and thence through the chute 27 and the discharge outlet 28.

The configuration of the cams may be modified as desired so as to elevate the screen suddenly and thus throw the grain upward beyond the highest point reached by the screen itself, or so as to lift the screen by a more uniform movement and then cause the same to suddenly drop from beneath the grain thus causing the upward projection of the latter to no higher elevation than the maximum point reached by the screen. In either case, however, the distance through which the grain is allowed to fall is sufficient to permit the unbalanced elongated grains of wild oats or the like to assume a vertical position before reaching the screen in readiness to pass through the same.

I claim:

In the separating of elongated grains heavier at one end from grains of substantially symmetrical shape by the use of a screen having a mesh to exclude the passage therethrough of the symmetrical grains, the steps of feeding a mixture of such grains to the screen and forming a thin layer thereon, and imparting an up and down movement to the screen to throw the layer of grains upwardly and permitting the grains to fall back against the screen, the length of descent of the grains being sufficient to permit the elongated unbalanced grains to assume a vertical position before reaching the screen, whereby said grains will pass through the screen and be separated from the substantially symmetrical grains.

In witness whereof I have hereunto signed my name in the presence of two subscribing witnesses.

RUDOLF SEIDL.

Witnesses:
FRANK A. MILLER,
F. J. SEIDL.

Copies of this patent may be obtained for five cents each, by addressing the "Commissioner of Patents, Washington, D. C."